No. 734,209. PATENTED JULY 21, 1903.
E. WHITCRAFT.
TRANSMISSION GEARING FOR AUTOMOBILES.
APPLICATION FILED OCT. 21, 1902.
NO MODEL. 2 SHEETS—SHEET 2.

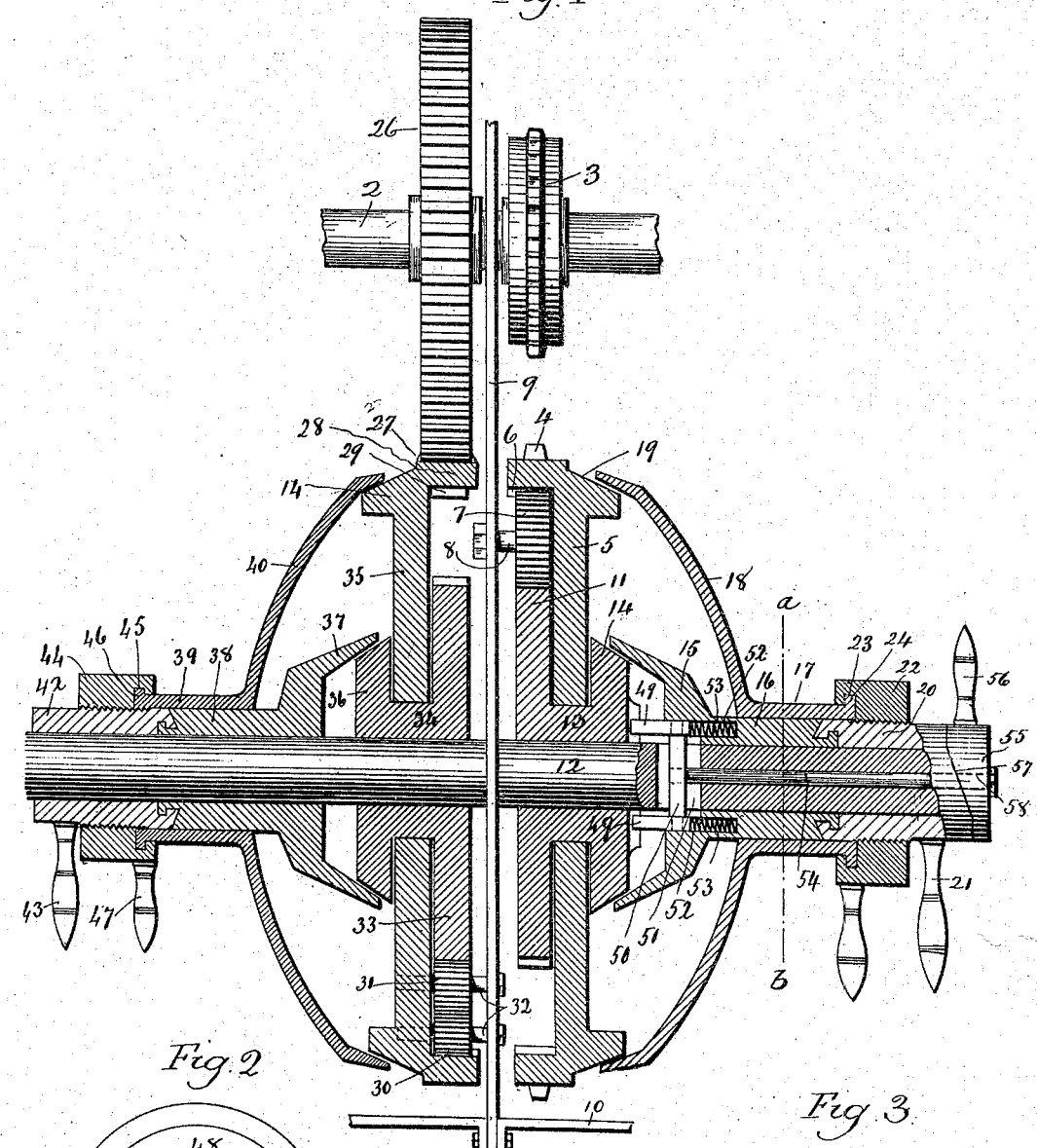
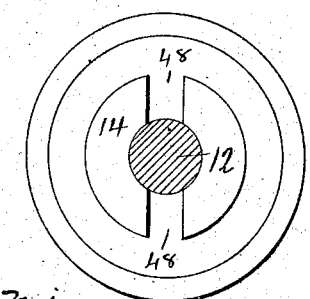
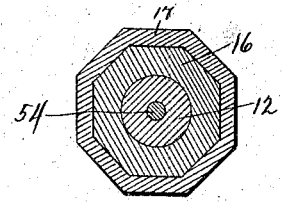

No. 734,209.

Patented July 21, 1903.

UNITED STATES PATENT OFFICE.

EDGAR WHITCRAFT, OF BRIGHTON, NEW YORK, ASSIGNOR OF ONE-HALF TO ALFRED C. BALDWIN, OF DERBY, CONNECTICUT.

TRANSMISSION-GEARING FOR AUTOMOBILES.

SPECIFICATION forming part of Letters Patent No. 734,209, dated July 21, 1903.

Application filed October 21, 1902. Serial No. 128,162. (No model.)

*To all whom it may concern:*

Be it known that I, EDGAR WHITCRAFT, of Brighton, in the county of Monroe and State of New York, have invented a new and useful Improvement in Transmission-Gearing for Automobiles; and I do hereby declare the following, when taken in connection with the accompanying drawings and the figures of reference marked thereon, to be a full, clear, and exact description of the same, and which said drawings constitute part of this specification, and represent, in—

Figure 4:
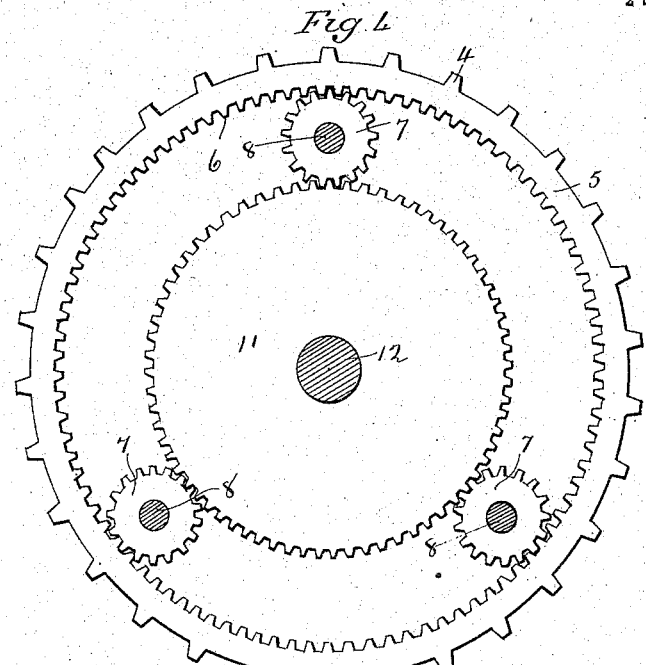
Figure 5:
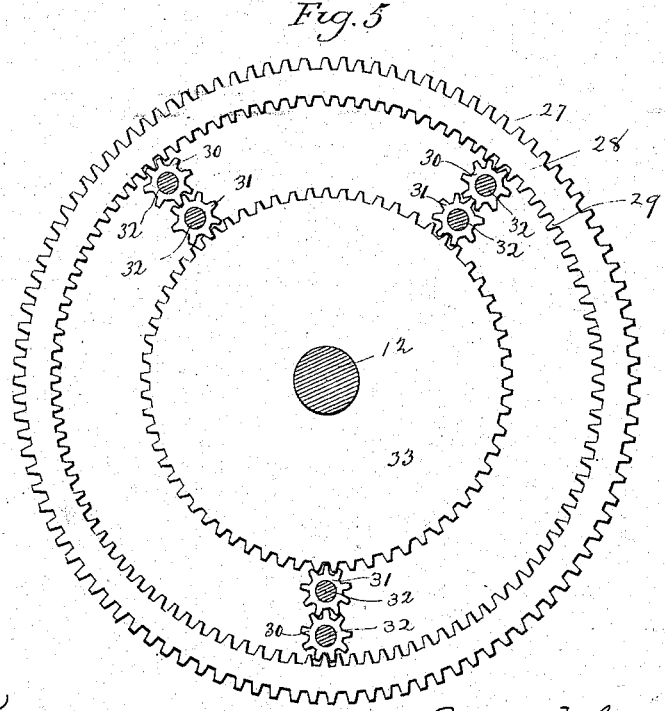

Figure 1, a view, partly in elevation and partly in vertical central section, of transmission-gearing constructed in accordance with my invention; Fig. 2, a detached view, in end elevation, of the low-speed friction-clutch cone, showing the driven shaft in section; Fig. 3, a view in transverse section on the line $a\ b$ of Fig. 1; Fig. 4, a view in inside elebation of the backward-motion friction-clutch cone, the low-speed gear, and the pinions interposed between them; Fig. 5, a view in inside elevation of the high-speed friction-clutch cone, the medium-speed gear, and the pinions interposed between them.

My invention relates to an improvement in transmission-gearing for automobiles, the object being to provide for easily and smoothly changing the speed of an automobile without the necessity of changing the speed of the motor thereof.

With these ends in view my invention consists in transmission-gearing having certain details of construction and combinations of parts, as will be hereinafter described, and pointed out in the claims.

In carrying out my invention as herein shown I employ a main or crank shaft 2, on which I locate a sprocket-wheel 3, driving a sprocket-chain (not shown) which meshes into sprocket-teeth 4, located on the outer periphery of what for convenience I shall hereinafter call the "backward-motion friction-clutch cone 5," the inner face of which is recessed and provided with inner peripheral teeth 6, meshed into by three equidistant pinions 7, mounted upon studs 8, set into a centrally-arranged steel frame-plate 9, to which the box or casing 10 is secured and which provides for connecting the transmission-gearing with hangers, (not shown, but attached to the body of the automobile in any approved manner.) The said pinions 7 mesh into what I shall hereinafter call the "low-speed gear" 11, which turns loosely upon the driven shaft 12, which carries a sprocket-wheel driving a sprocket-chain passing over a sprocket-wheel on the shaft carrying the vehicle-wheels. The construction just described is too well understood to need illustration. The said low-speed gear 11 has an outwardly-projecting hub 13, on which the backward-motion cone 5, before mentioned, is journaled so as to rotate freely. The outer end of the said hub 13 is provided with what I shall hereinafter call the "low-speed friction-clutch cone" 14, which coacts with the low-speed clutch-cup 15, keyed upon the shaft 12, so as to rotate therewith, but so as to be free to move longitudinally with respect thereto. The said cup 15 has an octagonal hub 16, over which fits and slides the octagonal sleeve 17 of the large backward-motion friction-clutch cup 18, the edges of which coact with the beveled flange 19, forming the cone proper of the backward-motion cone 5. By making the hub 16 and the sleeve 17 octagonal they are prevented from rotation with respect to each other and are left to move longitudinally independently of each other. This same result can be secured in many other obvious ways.

The outer end of the octagonal hub 16 has secured to it an operating-head 20, furnished with a lever 21, which is used for securing the low forward speed and which on that account I shall for convenience call the "low-speed forward-movement lever." The said head 20 is formed with external screw-threads taken into by the internal threads of an operating-ring 22, secured to the outer end of the octagonal sleeve 17 by means of a groove 23 and an annular shoulder 24, so that the ring may be rotated independently of the sleeve. When the lever 21 is used to rotate the head 20, the same will, on account of its threaded connection with the ring 22, move the low-speed friction-cup 15 into or out of engagement with the low-speed friction-clutch cone 14. When the cup 15 is engaged with the cone 14, the shaft 12 is driven and the vehicle propelled forward at its low speed, because the cup 15 is keyed to the said shaft 12 and because the cone 14 is constantly driven from the motor.

The operating-ring 22 is furnished with a lever 25, which on account of its function I shall for convenience call the "backward-motion lever." When the said lever 25 is operated, it causes the ring 22 to move inward or outward over the operating-head 20. When the said ring is moved inward, the large backward-motion friction-clutch cup 18 is frictionally coupled with the flange 19 of the backward-motion cone 5, which runs in the opposite direction from the medium-speed cone 14, which it drives through the pinions 7. When the lever 25 is operated, the operating-ring 22 is held against rotation by the lever 21. On the other hand, when the lever 21 is operated the head 20 is held against rotation by the lever 25, means being provided for holding the said levers stationary when they are not in use. Such means are well known and need no description.

The main or crank shaft 2 also carries a gear-wheel 26, meshing into spur-teeth 27, formed upon the outer periphery of what I shall hereinafter call the "high-speed friction-clutch cone" 28, the inner face of which is recessed and provided with inner peripheral gear-teeth 29, meshed into by the outer pinions 30 of three pairs of pinions, each pair of which also comprises a pinion 31. All of these pinions are mounted upon studs 32, set into the centrally-arranged frame-plate 9, before mentioned, and projecting therefrom on the side thereof opposite to the studs 8, carrying the pinions 7. The said inner pinions 31 mesh into the medium-speed gear 33, which is loosely mounted on the driven shaft 12 and formed with an outwardly-extending hub 34, on which the high-speed friction-clutch cone 35 turns loosely. The outer end of the said hub 34 terminates in the medium-speed friction-clutch cone 36, coacting with the medium-speed friction-clutch cup 37, which is keyed to the shaft 12 and has an outwardly-projecting octagonal hub 38, over which fits the octagonal sleeve 39 of the large high-speed friction-clutch cup 40, which coacts with the beveled flange 41, constituting the cone proper of the high-speed friction-clutch cone 35 aforesaid. An operating-head 42, connected with the said hub 38, is provided with a lever 43, constituting the medium-speed lever of the device. The said head 42 is provided with external screw-threads taken into by the internal screw-threads of an operating-ring 44, the inner portion of which is formed with a groove 45, receiving a shoulder 46, formed upon the outer end of the octagonal sleeve 39 of the cup 40, whereby the said sleeve 39 is coupled with the operating-ring 44, which is free to rotate independently of the sleeve. The said operating-ring 44 is provided with an operating-lever 47, constituting the high-speed lever of the device. When the lever 43 is operated, the lever 47 being at this time held against movement, the operating-head 42 will be moved inward or outward and, if inward, frictionally couple the cup 37 and the cone 36. On the other hand, when the lever 47 is operated, the lever 43 being at this time held against movement, the operating-ring 44 will move inward or outward and, if inward, cause the large cup 40 to be frictionally coupled with the cone 35.

All of the gears and pinions described are constantly driven; but the driven shaft 12 is turned in one direction or the other for propelling the automobile forward or back only when one of the four friction-cups is brought into play. The gears 11 and 33 and the cones 14 and 36, it should be explained, rotate in the same direction, while the backward-motion cone 5 rotates in the opposite direction. When it is desired to drive the automobile forward at the low speed, the low-speed lever 21 is operated so as to frictionally couple the cup 15 with the cone 14. Then as the cup 15 is keyed to the shaft 12 the same will be rotated at the speed of the cone 14. If it is desired to drive the automobile forward at its highest speed, the high-speed lever 47 is operated so as to frictionally couple the large cup 40 with the high-speed friction-clutch cone 35. Then as the cup 40 is keyed to the shaft 12 the same will be rotated at the speed of the said high-speed cone 35. When it is desired to drive the automobile at a medium speed, the medium-speed lever 43 is operated so as to frictionally couple the cup 37 with the cone 36. Then as the cup 37 is keyed to the shaft 12 the same will be rotated at the speed of the cone 36. If it is desired to propel the automobile backward, the backward-motion lever 25 is operated so as to cause the cup 18 to be frictionally coupled with the reversely-rotating backward-motion cone 5. Then as the cup 18 is keyed to the shaft 12 the same will be reversely rotated at the speed of the cone 5. It will thus be seen that while the device provides a medium, high, and low forward speed it provides only one backward speed.

If desired, means for positively connecting the cups and cones may be provided. Such means are illustrated as applied to the medium-speed forward cone 14, but may of course be applied to any of the cones. A positive clutch of this character might be supplied, for instance, as a safety device in hill-climbing, for which purpose a friction-coupling between the cups and cones might be thought insufficient. As shown, the outer face of the cone 14 is formed with two recesses 48, Fig. 2, adapted to receive clutch-bars 49, Fig. 1, secured to a cross-piece or head 50, located in a slot 51, formed in the shaft 12 and projecting at its ends into recesses 52, formed in the cup 15, and receiving the said clutch-bars 49, as well as springs 53 53, which exert a constant effort to move them inward into the recesses 48 in the cone 15. The said head 50 is attached to the inner end of an operating-rod 54, extending outwardly through the center of the shaft 12 and through the operating-head 20 and connected at its outer end with a cam-head 55, furnished with a positive clutch-lever 56 and formed with a cam-face 57, coacting with a corresponding cam-face 58 upon the outer end of the head 20. When it is desired to positively couple the cup 15 and the cone 14, the lever 56 is operated, as shown in Fig. 1, to permit the rod 54 to be moved inward by the springs 53, which force the clutch-bar 49 into the recesses 48.

It will be understood, of course, that the particular instrumentalities for operating the cups may be arranged in a variety of ways and that other positive clutches might be employed instead of the one chosen for illustration. I would therefore have it understood that I do not limit myself to the exact construction shown and described, but hold myself at liberty to make such variations therefrom as fairly fall within the spirit and scope of my invention.

Having fully described my invention, what I claim as new, and desire to secure by Letters Patent, is—

1. In transmission-gearing for automobiles, the combination with a driven shaft, of a low-speed friction-clutch cone, a backward-motion friction-clutch cone, a high-speed friction-clutch cone and a medium-speed friction-clutch cone, all loosely mounted upon the said shaft, and all constantly driven in the same direction with the exception of the backward-motion cone which rotates in the opposite direction from the others, friction-clutch cups coacting with the respective friction-cones, all of the said cups rotating with the said driven shaft, and manual means for independently operating any one of the said friction-cups, whereby the shaft is rotated at the speed of the cone brought into play by the engagement with it of its coacting cup, the said backward-motion cone and high-speed cone being positively driven, and in turn driving the low-speed cone and the medium-speed cone.

2. In transmission-gearing for automobiles, the combination with a driven shaft, of a low-speed gear loosely mounted thereupon and carrying a low-speed friction-clutch cone, a backward-motion friction-clutch cone geared to the said low-speed gear, a medium-speed gear loosely mounted upon the said shaft and carrying a medium-speed friction-clutch cone, a high-speed friction-clutch cone geared to the said medium-speed gear, four friction-clutch cups arranged to coact with the said cones respectively and to rotate the said driven shaft, and means for operating the said friction-clutch cups independently of each other, all of the said cones being constantly driven in the same direction with the exception of the backward-motion cone which rotates in an opposite direction from the others.

3. In transmission-gearing for automobiles, the combination with a driven shaft, of a gear turning loosely thereupon and carrying a friction-clutch cone, a backward-motion friction-clutch cone, gearing between the said gear and backward-motion cone, whereby the gear is driven in the opposite direction from the said backward-motion cone, friction-clutch cups connected with the said driven shaft for rotating the same and coacting with the said cones, and means for operating the said cups independently of each other, whereby the shaft is rotated at the speed of the cone brought into play by the engagement with it of its coacting cup.

4. In transmission-gearing for automobiles, the combination with a driven shaft, of a medium-speed gear turning loosely thereupon and carrying a medium-speed friction-clutch cone, a high-speed friction-clutch cone, gearing between the said medium-speed gear and high-speed cone, means for positively driving the said high-speed cone, friction-cups connected with the said shaft for rotating the same and respectively coacting with the said cones, and means for operating the said cups independently of each other, whereby the shaft is rotated at the speed of the cone brought into play by the engagement with it of its coacting cup.

5. In transmission-gearing for automobiles, the combination with a driven shaft, of a gear turning loosely thereupon and provided with a hub carrying a friction-clutch cone, a backward-motion friction-clutch cone loosely mounted upon the said hub and provided with external and internal gear-teeth, one or more pinions interposed between the internal gear-teeth of the backward-motion cone and the teeth of the said gear, whereby the same is driven in the opposite direction from the said backward-motion cone, which is driven through its external gear-teeth, friction-clutch cups connected with the said driven shaft for rotating the same and coacting with the said cones, and means for operating the said cups independently of each other, whereby the shaft is rotated at the speed of the cone brought into play by the engagement with it of its coacting cup.

6. In transmission-gearing for automobiles, the combination with a driven shaft, of a medium-speed gear mounted loosely thereupon and provided with a hub carrying a medium-speed friction-clutch cone, a high-speed friction-clutch cone loosely mounted upon the said hub and provided with external and internal teeth, one or more pairs of pinions interposed between the internal teeth of the high-speed cone and the medium-speed gear, whereby the latter is driven from the former and in the same direction, means for driving the said high-speed cone through its external teeth, friction-cups connected with the said shaft for rotating the same and respectively coacting with the said cones, and means for operating the said cups independently of each other, whereby the shaft is rotated at the speed of the cone brought into play by the engagement with it of its coacting cup.

7. In transmission-gearing for automobiles, the combination with a driven shaft, of a low-speed gear loosely mounted thereupon and carrying a low-speed friction-clutch cone, a backward-motion friction-clutch cone, a medium-speed gear loosely mounted upon the said shaft and carrying a medium-speed friction-clutch cone, a high-speed friction-cone, a frame-plate located between the said medium-speed gear and the low-speed gear, pinions carried by the said plate and interposed between the low-speed gear and the backward-motion cone, pinions carried by the said plate and interposed between the medium-speed gear and the high-speed cone, friction-clutch cups connected with the driven shaft for rotating the same, and means for operating any one of the said cups independently of the others for coaction with their respective cones, whereby the said shaft is rotated at the speed of the cone brought into play, all of the said cones being constantly driven in the same direction with the exception of the backward-motion cone which rotates in an opposite direction from the others.

8. In transmission-gearing for automobiles, the combination with a driven shaft, of a gear loosely mounted thereupon and carrying a friction-clutch cone, another friction-clutch cone also loosely turning with respect to the said shaft, means for driving the cone last mentioned, gearing for driving the said gear from the friction-cone last mentioned, friction-clutch cups for rotating the said shaft, means for independently operating the said cups for coaction with their respective cones, whereby the said shaft is rotated, and positive clutch mechanism for reinforcing the friction-coupling between a cone and its cup.

In testimony whereof I have signed this specification in the presence of two subscribing witnesses.

EDGAR WHITCRAFT.

Witnesses:
MICHAEL J. MURPHY,
BERT VAN TASSELL.